(12) United States Patent
Tang

(10) Patent No.: US 12,474,694 B2
(45) Date of Patent: Nov. 18, 2025

(54) VEHICLE END-OF-LINE TESTING WITH AN AUTONOMOUS CONVEYOR TRANSPORT SYSTEM

(71) Applicant: Ford Global Technologies, LLC, Dearborn, MI (US)

(72) Inventor: Beni Tang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 373 days.

(21) Appl. No.: 18/318,350

(22) Filed: May 16, 2023

(65) Prior Publication Data
US 2024/0385597 A1 Nov. 21, 2024

(51) Int. Cl.
*G05B 19/41* (2006.01)
*G05B 19/418* (2006.01)

(52) U.S. Cl.
CPC ... *G05B 19/4182* (2013.01); *G05B 19/41805* (2013.01); *G05B 2219/2637* (2013.01); *G05B 2219/45055* (2013.01)

(58) Field of Classification Search
CPC .......... G05B 19/4182; G05B 19/41805; G05B 2219/2637; G05B 2219/45055
See application file for complete search history.

(56) References Cited

U.S. PATENT DOCUMENTS

| | | | | |
|---|---|---|---|---|
| 4,766,547 | A * | 8/1988 | Modery | B61L 23/005 700/229 |
| 6,004,091 | A * | 12/1999 | Roth | E04H 6/282 414/253 |
| 10,692,308 | B2 | 6/2020 | Cho et al. | |
| 11,214,321 | B1 | 1/2022 | Santillo et al. | |
| 2018/0074478 | A1* | 3/2018 | Burkhard | G05B 19/418 |
| 2020/0189675 | A1* | 6/2020 | Gao | B23P 19/04 |
| 2020/0385075 | A1* | 12/2020 | Robbin | B60L 50/53 |
| 2021/0397180 | A1* | 12/2021 | Thomas | G05D 1/0297 |

FOREIGN PATENT DOCUMENTS

JP H06115606 4/1994

* cited by examiner

*Primary Examiner* — Christopher W Carter
(74) *Attorney, Agent, or Firm* — Burris Law, PLLC

(57) ABSTRACT

An end-of-line task system includes a plurality of bays each including a plurality of task stations and a task execution system for executing software-based tasks, a conveyor system for transporting the vehicle to and from the plurality of bays, and a task and vehicle management system. The task and vehicle management system includes a station module for collecting data from the task stations and for determining whether each of the task stations is available to receive the vehicle, an assignment module, and a transport module. The assignment module obtains a task request for the vehicle to perform a task. The assignment module assigns the vehicle to a selected bay based on the task request and to a selected task station based on availabilities of the task stations. The transport module operates the conveyor system to transport the vehicle to the selected bay and to the selected task station.

20 Claims, 3 Drawing Sheets

VEHICLE END-OF-LINE TESTING WITH AN AUTONOMOUS CONVEYOR TRANSPORT SYSTEM

FIELD

The present disclosure relates to a transfer system for testing and diagnosing a vehicle, and more specifically to a transfer system capable of automatically entering and discharging a vehicle into and from a test zone for testing/diagnosis.

BACKGROUND

The statements in this section merely provide background information related to the present disclosure and may not constitute prior art.

An end of line (EOL) vehicle testing is provided at an end of a vehicle assembly line for testing the overall functionality of vehicles during the manufacturing process. Typically, the various EOL tests are performed on the vehicles in a sequential process flow. Therefore, the typical EOL testing cannot be performed on the vehicles efficiently. Also, when an unexpected malfunction occurs in the EOL, the EOL line has to stop until the issue is resolved.

The issues relating to the inefficiency and possible downtime of the EOL are addressed in the present disclosure.

SUMMARY

This section provides a general summary of the disclosure and is not a comprehensive disclosure of its full scope or all of its features.

In one form, an end-of-line task system for evaluating a vehicle is provided, which includes a plurality of bays, each bay including a plurality of task stations and a task execution system configured to execute one or more software-based tasks, a conveyor system configured to transport the vehicle to and from the plurality of bays, and a task and vehicle management system. The task and vehicle management system includes a station module configured to collect data from each of the task stations and to determine whether each of the task stations is available to receive the vehicle, an assignment module, and a transport module. The assignment module is configured to obtain a task request for the vehicle to perform a task and assign the vehicle to a selected bay from among the plurality of bays and to a selected task station from among the plurality of task stations of the selected bay based on availabilities of the task stations and the task request. The transport module is configured to operate the conveyor system to transport the vehicle to the selected bay.

In other features, the conveyor system includes a rotating platform at each bay. The plurality of bays are disposed linearly along at least one side of the conveyor system. The plurality of task stations of each of the plurality of bays are disposed around the rotating platform in an arcuate arrangement. The rotating platform of the bay is operable to align the vehicle parked thereon with any one of task stations from among the plurality of task stations. The conveyor system includes a linear platform extending between the plurality of bays.

In other features, the task and vehicle management system is further configured to include a bay task assignment database configured to store data indicative of a type of task performed in each bay. The station module is configured to obtain data indicating a status of the plurality of task stations. The assignment module is configured to assign the vehicle to one of the task stations based on at least one of the status and data in the bay task assignment database. The status of the task stations indicates if a selected task station is available for executing a task, is currently performing a task, or off-line. The transport module is configured to operate the linear platform to move the vehicle to the selected bay having the selected task station. The transport module is configured to operate the rotating platform to align the vehicle with the selected task station. The transport module is configured to, upon completion of the task, operate the conveyor system to move the vehicle out of the selected task station. The task execution system is configured to execute the task of the selected bay.

In other features, the task execution system is configured to provide data of the task performed per the task request to the task and vehicle management system. The task request includes at least one of a calibration, a software task, a diagnostic test, or a repair operation. The task execution system includes a task execution module provided at each task station of the plurality of task stations.

In still another form, an end-of-line task system for evaluating a vehicle is provided, which includes a plurality of bays, a conveyor system, and a task and vehicle management system. Each bay includes a plurality of task stations and a task execution system configured to execute one or more software-based tasks. The conveyor system extends between the plurality of bays and configured to transport the vehicle to and from the plurality of bays. The conveyor system includes a linear platform extending between the plurality of bays, and a set of rotating platforms provided at set of bay from among the plurality of bays wherein the rotating platform is operable to move the vehicle to a station from among the plurality of stations. The task and vehicle management system includes a station module, an assignment module, and a transport module. The station module is configured to collect data from each of the task stations and to determine whether each of the task stations is available to receive the vehicle. The assignment module is configured to obtain a task request for the vehicle to perform a task and assign the vehicle to a selected bay from among the plurality of bays and to a selected task station from among the plurality of task stations of the selected bay based on availabilities of the task stations and the task request. The transport module is configured to operate the conveyor system to transport the vehicle to the selected bay.

In other features, the plurality of task stations of each by of the set of bays are disposed in an arcuate arrangement about the rotating platform. The rotating platform of the bay from among the set of bays is operable to align with any one of task stations from among the plurality of task stations in the arcuate arrangement. The transport module is configured to operate the conveyor system. The transport module is configured to, upon completion of the task, operate the conveyor system to move the vehicle out of the selected task station. The task and vehicle management system is further configured to include a bay task assignment database configured to store data indicative of type of task performed by each task station for each bay. The station module is configured to obtain data indicating a status of the plurality of task stations. The assignment module is configured to assign the vehicle to one of the task stations based on at least one of the status and data in the bay task assignment database. The plurality of bays are arranged linearly along at least one side of the conveyor system.

In still another form, an end-of-line task system for evaluating a vehicle is provided, which includes: a plurality of bays, each including a plurality of task stations and a task execution system configured to execute one or more software-based tasks; a task and vehicle management system configured to obtain a task request and assign the vehicle to one of the bays based on the task request and to one of the task stations based on availabilities of the task stations in the one of the bays; and a conveyor system configured to transport the vehicle to and from the plurality of bays. The conveyor system includes a rotating platform disposed in each of the plurality of bays. The conveyor system transports the vehicle to the one of the bays and then to the one of the task stations via the rotating platform in the one of the bays.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
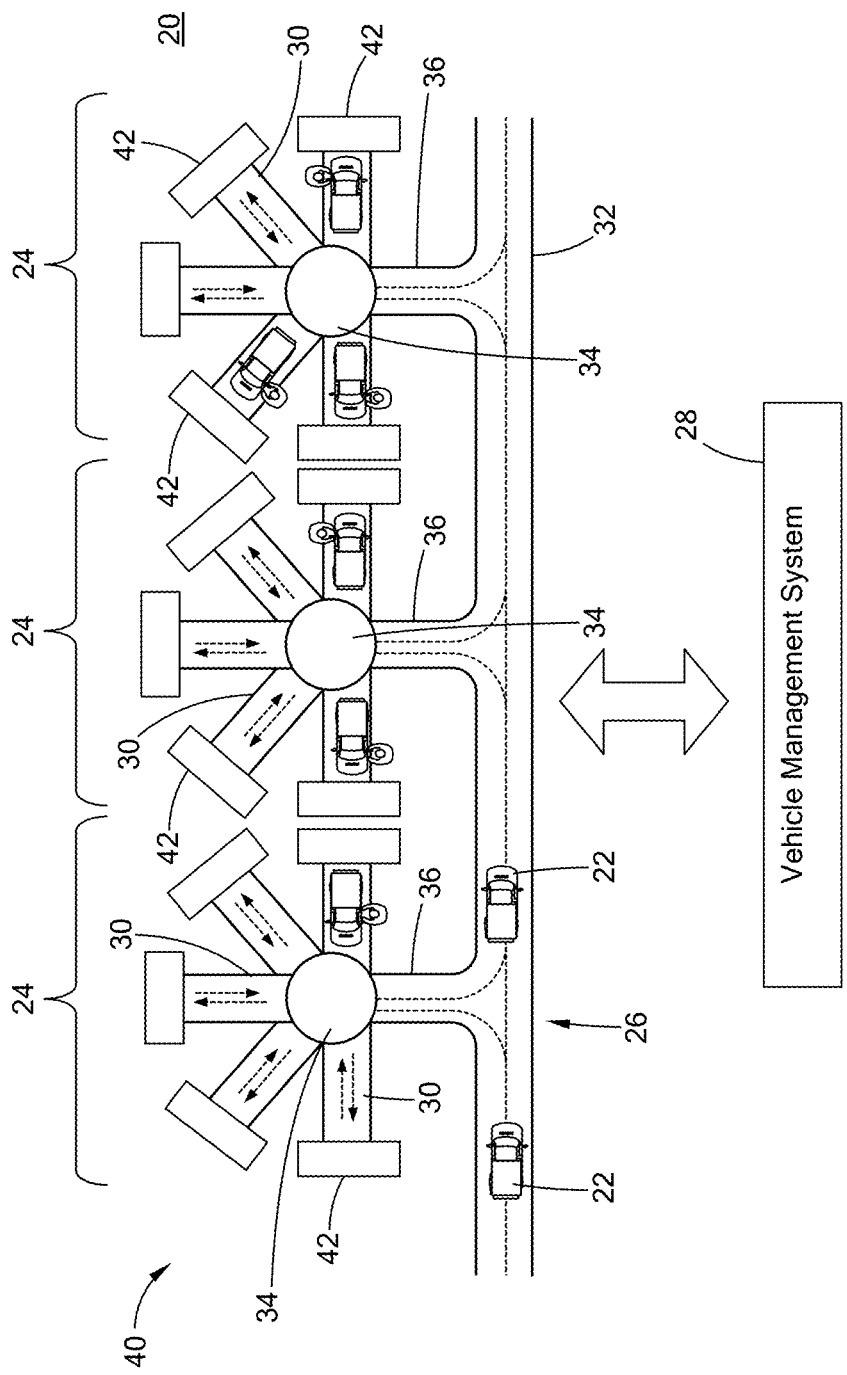
FIG. 1 is a schematic view of an end-of-line task system constructed in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, an end-of-line (EOL) task system 20 for evaluating vehicles 22 constructed in accordance with the teachings of the present disclosure is generally indicated by reference number 20. The EOL system 20 may be disposed at the end of an assembly line (not shown). The vehicles 22 may be factory vehicles that have been assembled in the assembly line. Once the factory vehicles are assembled and exit the assembly line, the factory vehicles are transported to the EOL task system 20 for testing and diagnosis. The EOL task system 20 is an automatic conveyor transport system (ACTS) that automatically transports the vehicles 22 to any one of test stations (or task stations) depending on their availability.

Figure 3:
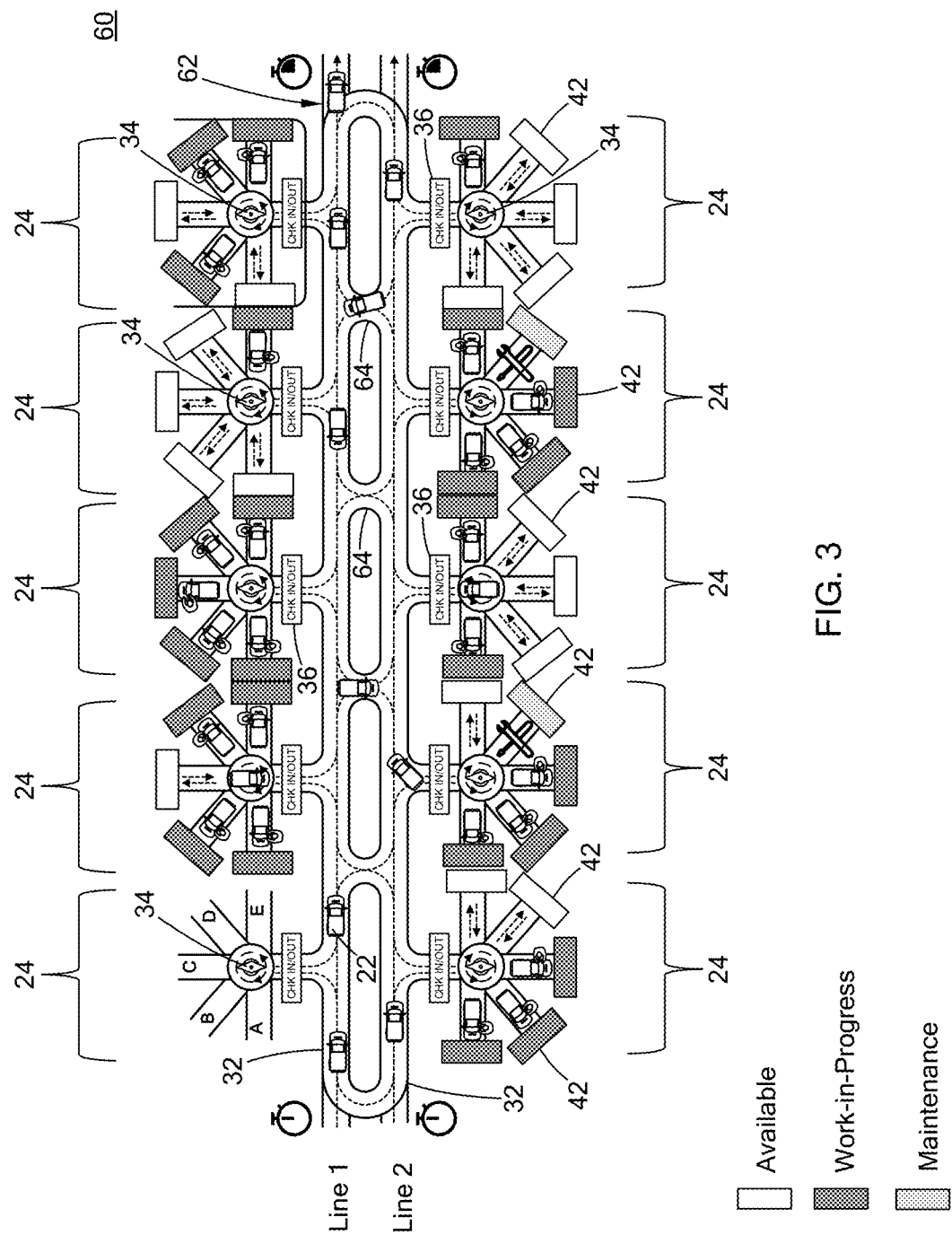
FIG. 3 is a schematic view of a variant of an end-of-line task system constructed in accordance with the teachings of the present disclosure.

The EOL task system 20 includes a plurality of bays 24, a conveyor system 26 for transporting the vehicles 22 to and from the plurality of bays 24, and a task and vehicle management system 28. The plurality of bays 24 may be disposed linearly along one longitudinal side of the conveyor system 26 as shown in FIG. 1 or along both longitudinal sides of the conveyor system 26 as shown in FIG. 3.

The task and vehicle management system 28 is in communication with the plurality of bays 24 and the conveyor system 26 and is configured to manage the number of vehicles being transported into/out of the test zones of the plurality of bays 24 and to ensure that each vehicle complete and pass all the predetermined tests/diagnoses in the plurality of bays 24 before existing the EOL task system 20.

Each bay 24 represents a test zone and includes a plurality of task stations 30, and a task execution system 40 for executing one or more software-based tasks on the vehicle(s) 22. In one form, the task execution system 40 may include a plurality of task execution modules 42 corresponding to the plurality of task stations 30. The task execution system 40 for a particular bay 24 is configured to execute a particular task, which may be calibration, a software task, a diagnostic test, or a repair operation. The task execution system 40 may also include a controller (not shown) to provide data indicating the status of the task stations 30 (such as availability of the task stations) and the work (e.g., a particular test or diagnosis) that has been performed on the vehicles to the task and vehicle management system 28.

The conveyor system 26 include a linear platform 32 extending along one side of the plurality of bays 24, a plurality of rotating platforms 34 disposed inside the plurality of bays 24, and a plurality of connecting platforms 36 connecting the linear platform 32 to a corresponding one of the rotating platforms 34. The plurality of task stations 30 in each bay 24 are disposed radially from the rotating platform 34 in an arcuate arrangement about the rotating platform 34. The task stations 30 in the same bay 24 may be configured to perform the same type of testing/diagnosis and the plurality of bays 24 may are configured to perform different types of testing/diagnoses. It is understood that the task stations 30 in the same bay 24 may be configured to perform different testing/diagnostic tasks without departing from the scope of the present disclosure.

After the vehicles 22 leave the assembly line, the vehicles 22 sequentially enter the conveyor system 26. Each vehicle 22 is delivered by the linear platform 32 to an area adjacent to a particular bay 24 and is further transported from the linear platform 32, through a corresponding one of the connecting platforms 36 to the rotating platforms 34 in the particular bay 24. The rotating platform 34 rotates the vehicle 22 to be aligned with one of the task stations 30 selected by the task and vehicle management system 28 and then the vehicle 22 is moved to the selected task station 30 for testing/diagnosis. After the testing/diagnosis is completed, the vehicle 22 is moved from the selected task station 30 to the rotating platform 34. The rotating platform 34 rotates the vehicle 22 to be aligned with the connecting platform 36, such that the vehicle 22 can be transported through the connecting platform 36 back to the linear platform 32. The vehicle 22 is then transported by the linear platform 32 to another bay 24 for another testing/diagnosis.

The arrangement of the bays 24 and the delivery system 26 allows more than one vehicle 22 to be tested and diagnosed in the same bay 24 at the same time. After the vehicle 22 is moved out of the rotating platform 34 to a particular task station 30 for testing/diagnosis, the rotating platform 34 is available to accept another vehicle 22 so that another vehicle 22 can be transported to another task stations 30 in the same bay 24 for testing/diagnosis. Moreover, the arrangement of the bays 24 and the delivery system 26 allows an unexpected malfunction of one task station 30 to occur without affecting the testing and/or diagnosis of vehicle(s) 22 parked in the same bay 24 or different bays 24.

Figure 2:
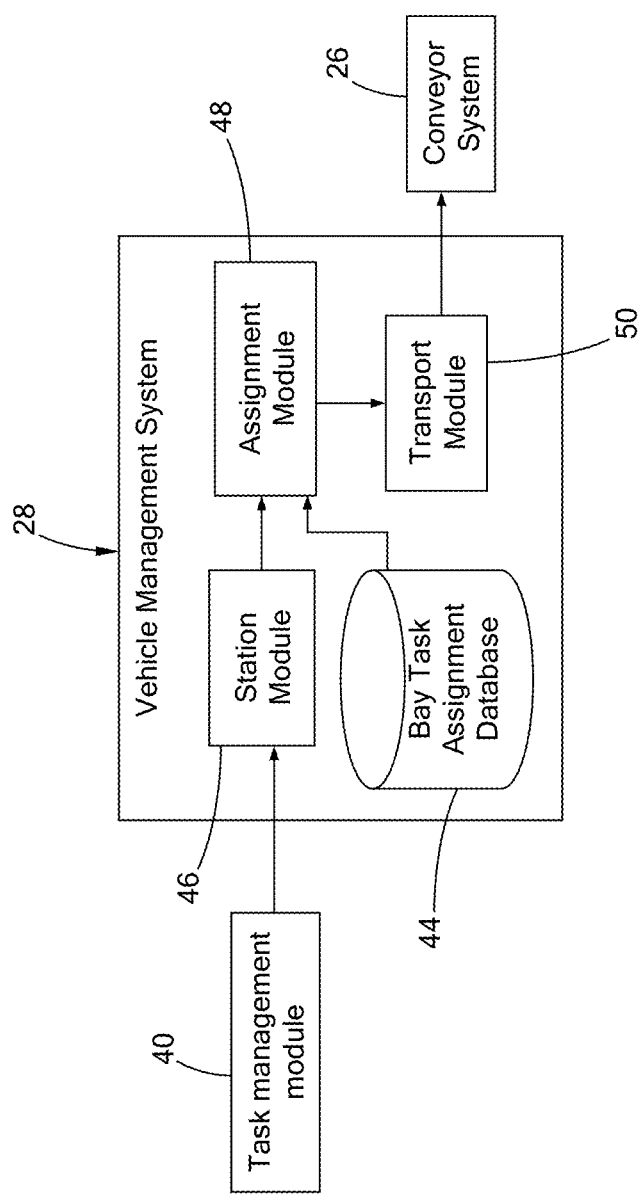
FIG. 2 is a diagram of a task and vehicle management system of an end-of-line task system constructed in accordance with the teachings of the present disclosure.

Referring to FIG. 2, the task and vehicle management system 28 is configured to manage traffic flow of the vehicle 22 in the EOL task system 20. The task and vehicle management system 28 includes a bay task assignment database 44, a station module 46, an assignment module 48, and a transport module 50.

The bay task assignment database 44 is configured to store data indicative of a type of task performed by the task stations 30 in each bay 24. The station module 46 is configured to obtain data indicating the status of the plurality of task stations 30 in the plurality of bays 24 from the task execution modules 42 in the plurality of bays 24. The station module 46 then determines the status of each task stations 30 as one of "Work-In-Progress", "AVAILABLE" and "MANTENANCE," etc.

The assignment module 48 is configured to obtain a task request for a vehicle 22, for example, from a control center (not shown), to perform a particular task. The task request may be calibration, a software task, a diagnostic test, or a repair operation. The assignment module 48 receives data indicating the status of the task stations 30 from the station module 46, particularly the data indicating which task stations 30 are available. The assignment module 48 also receives data from the bay task assignment database 44 regarding the type of tasks being performed in each bay 24 and determines which bay 24 can perform the requested task. The assignment module 48 assigns each vehicle 22 to a selected one of the task stations 30 in a selected one of the bays 24 based on the task request, the status (i.e., availability) of the task stations 30, and the data stored in the bay task assignment database 44 regarding the type of tasks performed in each bay 24. The assignment module 48 then send a signal or data relating to this assignment to the transport module 50, which, in turns, sends a control signal to the conveyor system 26 to transport the vehicle 22 to the selected bay 24 and then to the selected task station 30.

After the vehicle 22 is transported to the selected task station 30, the task execution module 42 associated with the selected task station 30 performs the requested task on the vehicle 22. The task execution system 40 may include a controller (not shown) to constantly provide an update on the status of the selected task station 30 to the task and vehicle management system 28, such as Available, Work-In-Progress or Work-Completed. Upon receipt of data indicating that the requested task is completed, the transport module 50 of the task and vehicle management system 28 operates the conveyor system 26 to move the vehicles 22 out of the selected task station 30. The task execution system 40 also sends data regarding an update on the status of the selected task station 30 to the station module 46.

In another form, the task and vehicle management system 28 may manage the test traffic flow based on both status of the bays 24 and status of the task stations 30. The status of the bays 24 indicates the manageable load capacity of the bays 24 and the allowable percentage of maintenance. The status of the task stations refers to the availability of the task stations and may include "Work-In-Progress", "AVAILABLE" or "MANTENANCE." In other words, the assignment module 48 may assign the vehicle 22 to a selected bay 24 based on the task request and the status of the bays 24 and may assign the vehicle 22 to a selected task station 30 in the selected bay 24 based on availabilities of the task stations 30. Where multiple task stations 30 in a particular bay 24 malfunction or are under maintenance, the task and vehicle management system 28 can streamline the vehicles in-plant flow based on the manageable load capacity of the particular bay 24 and the allowable percentage of maintenance at the bays 24 to ensure continuity of the EOL test operation without interruption. Once a vehicle 22 completes all required EOL tests/diagnosis without any quality issue, the task and vehicle management system 28 sends a notification of completion of the EOL test/diagnosis of a particular vehicle to a manufacturer staff.

Referring to FIG. 3, a variant of an EOL task system 60 constructed in accordance with the teachings of the present disclosure include a plurality of bays 24, a conveyor system 62, and a task and vehicle management system 28 (only shown in FIGS. 1 and 2). The EOL system 60 is similar to the EOL task system 20 of FIG. 1 except for the structure of the conveyor system 62 and the arrangement of the plurality of bays 24 relative to the conveyor system 62. In the EOL task system 60 shown in FIG. 3, the status of the plurality of task stations 30, i.e., "Available," "Work-in-Progress," and "Maintenance," are also shown for illustrative purposes. In the following, like elements will be indicated by like reference numerals and the detailed description thereof will be omitted for clarity.

In the EOL task system 60, the plurality of bays 24 are arranged into two rows with the conveyor system 62 disposed therebetween. The conveyor system 62 include two linear platforms 32 that are parallel to each other, a plurality of rotating platforms 34 disposed inside the bays 24, a plurality of connecting platforms 36 connecting a corresponding one of the linear platforms 32 to a corresponding one of the rotating platforms 34, and a plurality of routing platforms 64 disposed between the two linear platforms 64 to allow the vehicles 22 to be routed from one linear platform 64 to another linear platform 32.

The plurality of vehicles 22 may be arranged into two lines (i.e., Line 1 and Line 2), and sequentially transported to the two linear platforms 32. The plurality of bays 24 also form multiple pairs of bays 24 disposed opposing the linear platforms 32. Each pair of the bays 24 may be configured to perform the same task/diagnosis. When one of a particular pair of bays 24 has no available task station to perform the desired test/diagnosis, the vehicle 22 adjacent to the one of the particular pair of bays 24 may be routed, through the routing platforms 64, to another one of the particular pair of bays 24 to perform the requested test/diagnosis. The EOL task system 60 also includes a task and vehicle management system (not shown in FIG. 3) similar to the one shown in FIGS. 1 and 2 for monitoring and controlling the traffic of the vehicles 22 on the conveyor system 62 in a similar manner and thus the description thereof is omitted herein for clarity.

With the EOL system of the present disclosure, the task and vehicle management system 28 constantly monitors the status of each task stand 30 (i.e., availability) in each bay 24 and status of the bays 24 (i.e., the manageable load capacity of the bays 24 and the allowable percentage of maintenance), and then adjust the vehicles 22 in and out traffic flow accordingly. Therefore, the EOL system can intelligently manages the transportation of the vehicles 22 to ensure smooth flow of the vehicles 22 for testing/diagnosis without being interrupted even if one or more task stations 30 are unavailable due to malfunction or maintenance.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An end-of-line task system for evaluating a vehicle, the system comprising:
   a plurality of bays, each including a plurality of task stations and a task execution system configured to execute one or more software-based tasks;
   a conveyor system configured to transport the vehicle to and from the plurality of bays; and
   a task and vehicle management system comprising:
      a station module configured to collect data from each of the task stations and to determine whether each of the task stations is available to receive the vehicle;
      an assignment module configured to
         obtain a task request for the vehicle to perform a task, and
         assign the vehicle to a selected bay from among the plurality of bays and to a selected task station from among the plurality of task stations of the selected bay based on availabilities of the task stations and the task request; and
      a transport module configured to operate the conveyor system to transport the vehicle to the selected bay.

2. The system of claim 1, wherein
the conveyor system includes a rotating platform in each of the plurality of bays,
the plurality of task stations of each of the plurality of bays are disposed in an arcuate arrangement, and
the rotating platform of each of the bays is operable to align the vehicle with any one of task stations from among the plurality of task stations.

3. The system of claim 1, wherein:
the task and vehicle management system is further configured to include a bay task assignment database configured to store data indicative of type of task performed by each task station for each bay,
the station module is configured to obtain data indicating a status of the plurality of task stations, and
the assignment module is configured to assign the vehicle to one of the task stations based on at least one of the status and data in the bay task assignment database.

4. The system of claim 3, wherein the status indicates if a selected task station is available for executing a task, is currently performing a task, or off-line.

5. The system of claim 1, wherein the conveyor system includes a linear platform extending between the plurality of bays.

6. The system of claim 5, wherein the transport module is configured to operate the linear platform to move the vehicle to the selected bay having the selected task station.

7. The system of claim 6, wherein:
the conveyor system includes a rotating platform at each by from among the plurality of bays, and
the transport module is configured to operate the rotating platform to align the vehicle with the selected task station.

8. The system of claim 1, wherein the transport module is configured to, upon completion of the task, operate the conveyor system to move the vehicle out of the selected task station.

9. The system of claim 1, wherein the task execution system is configured to execute the task of the selected bay.

10. The system of claim 9, wherein the task execution system is configured to provide data of the task performed per the task request to the task and vehicle management system.

11. The system of claim 1, wherein the task request includes at least one of a calibration, a software task, a diagnostic test, or a repair operation.

12. The system of claim 1, wherein the plurality of bays are arranged linearly along at least one side of the conveyor system.

13. The system of claim 1, wherein the task execution system includes a task execution module provided at each task station of the plurality of task stations.

14. An end-of-line task system for evaluating a vehicle, the system comprising:
   a plurality of bays, wherein each bay includes a plurality of task stations and a task execution system configured to execute one or more software-based tasks;
   a conveyor system extending between the plurality of bays and configured to transport the vehicle to and from the plurality of bays, wherein the conveyor system includes:

a linear platform extending between the plurality of bays; and a set of rotating platforms provided at a set of bays from among the plurality of bays wherein the rotating platform is operable to move the vehicle to a station from among the plurality of stations, and a task and vehicle management system comprising:

a station module configured to collect data from each of the task stations and to determine whether each of the task stations is available to receive the vehicle;

an assignment module configured to:

obtain a task request for the vehicle to perform a task, and assign the vehicle to a selected bay from among the plurality of bays and to a selected task station from among the plurality of task stations of the selected bay based on availabilities of the task stations and the task request; and a transport module configured to operate the conveyor system to transport the vehicle to the selected bay.

15. The system of claim 14, wherein:

the plurality of task stations of each by of the set of bays are disposed in an arcuate arrangement about the rotating platform, and the rotating platform of the bay from among the set of bays is operable to align with any one of task stations from among the plurality of task stations in the arcuate arrangement.

16. The system of claim 14, wherein the transport module is configured to operate the linear.

17. The system of claim 14, wherein the transport module is configured to, upon completion of the task, operate the conveyor system to move the vehicle out of the selected task station.

18. The system of claim 14, wherein:

the task and vehicle management system is further configured to include a bay task assignment database configured to store data indicative of type of task performed by each task station for each bay, the station module is configured to obtain data indicating a status of the plurality of task stations, and the assignment module is configured to assign the vehicle to one of the task stations based on at least one of the status and data in the bay task assignment database.

19. The system of claim 14, wherein the plurality of bays are arranged linearly along at least one side of the conveyor system.

20. An end-of-line task system for evaluating a vehicle, the system comprising:

a plurality of bays, each including a plurality of task stations and a task execution system configured to execute one or more software-based tasks;

a task and vehicle management system configured to obtain a task request, and assign the vehicle to one of the bays based on the task request and to one of the task stations in the one of the bays based on availabilities of the task stations in the one of the bays; and a conveyor system configured to transport the vehicle to and from the plurality of bays, the conveyor system including a rotating platform disposed in each of the plurality of bays, the conveyor system transporting the vehicle to the one of the bays and then to the one of the task stations via the rotating platform in the one of the bays.

* * * * *